Sept. 17, 1968  C. A. KUBILOS  3,401,711
SINGLE RECEIVER PORT JET DISPLACEMENT SERVOVALVE
Filed July 29, 1966  2 Sheets-Sheet 1
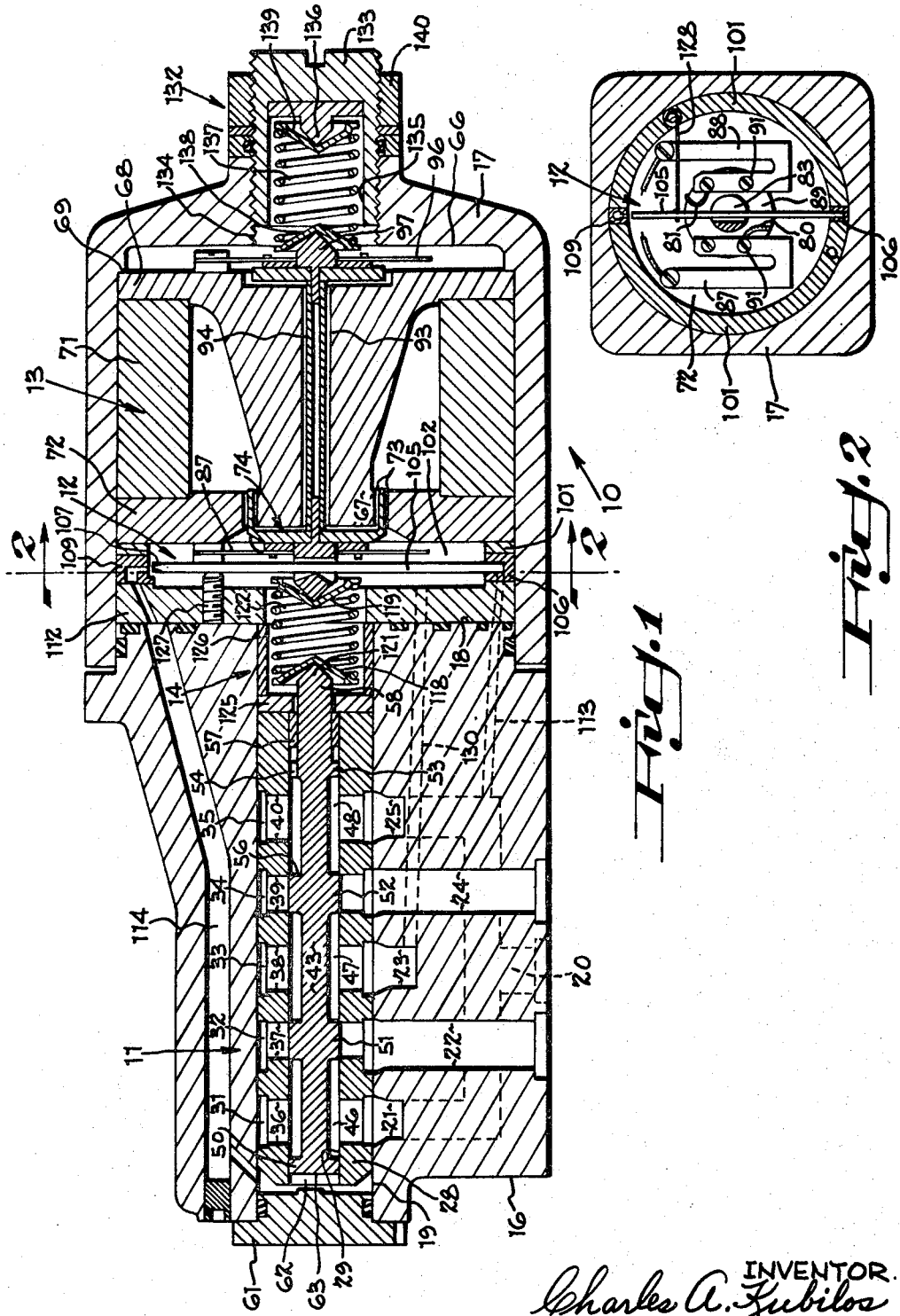
INVENTOR.
Charles A. Kubilos
BY
Donald J. Dietrich Sept. 17, 1968   C. A. KUBILOS   3,401,711
SINGLE RECEIVER PORT JET DISPLACEMENT SERVOVALVE
Filed July 29, 1966   2 Sheets-Sheet 2

INVENTOR
Charles A. Kubilos.
BY
Donald J. Dietrich

United States Patent Office 3,401,711
Patented Sept. 17, 1968

3,401,711
SINGLE RECEIVER PORT JET DISPLACEMENT
SERVOVALVE
Charles A. Kubilos, Oxnard, Calif., assignor to Abex
Corporation, New York, N.Y., a corporation of
Delaware
Filed July 29, 1966, Ser. No. 568,971
15 Claims. (Cl. 137—83)

ABSTRACT OF THE DISCLOSURE

An electrohydraulic servovalve of the type wherein a spool valve element in a main stage of the servovalve controls the passage of fluid through the main stage in accordance with fluid pressure forces acting upon opposed control surfaces of unequal areas on the spool. The fluid force acting on one of the control surfaces is dependent upon the magnitude of an electric current applied to a solenoid in a pilot stage of the valve. The solenoid applies a bending force to a jet tube which has a nozzle at one end that develops pressure at a receptor, depending on the degree of alignment of the jet with the receptor. When energized, the solenoid tends to deflect the jet from its centered no-current position with respect to the receptor. Pressure at the receptor is applied to the larger of the opposed control surfaces of the spool. A feedback spring is positioned between one end of the spool and the jet tube, and other spring means act in opposition to the force of the feedback spring. Pressure fluid from a source is applied into the jet tube and onto the smaller of the spool control surfaces.

---

This invention relates to an electrically controlled fluid pressure operated servovalve wherein the main flow of fluid through the valve is controlled by the displacement of an electromagnetically positioned jet of fluid, with respect to a single receiver port in a pilot stage.

Such valves are suitable for use in controlling the application of motive pressure fluid to a fluid motor, in response to an electrical input or control signal which is applied to the pilot or control stage of the servovalve. The valve may operate with either pneumatic or hydraulic fluid, and for purposes of illustration the operating fluid is primarily referred to hereinafter as hydraulic fluid.

Generally speaking, servovalves of the jet displacement type include a main valve stage through which the controlled fluid flows for example to or from a fluid motor. A movable main valve element or spool in the main stage is positioned with respect to a series of ports, to control the fluid, by the relative magnitude of fluid pressure forces acting on end or opposed control surfaces of the spool. An unbalance or differential between the fluid pressure forces acting upon the control surfaces of the movable main valve member tends to shift that valve member with respect to the ports, within the limits of movement of the valve member, until the pressure forces are equalized. The balance or unbalance of the pressure forces on the opposite control surfaces of the main valve member is controlled by a pilot valve stage.

In previous servovalves of the jet displacement type the pilot stages have been exceedingly delicate and complex devices. Such is their criticality that they are sometimes assembled in a "white" or "clean" room. Their cost has usually been so high as to limit use of the valves to aircraft or military applications. Hence they have not found such widespread commercial usage as their small size, sensitivity, force amplification, and ease of control would suggest.

In the past it has been conventional to use a jet tube which is displaceable between a pair of receptor ports connected respectively to opposite control surfaces of the main spool. Such jet tube-dual receptors have been especially characterized by the delicacy of their manufacture and adjustment.

In the pilot, or "first," stage of a valve in accordance with the present invention, a stream of fluid issuing as a jet from a nozzle impinges on a single receptor port. A fluid pressure is thereby produced in the receptor port which is roughly proportional to the degree of alignment of the nozzle over the receptor. This pressure is reflected to one of the control surfaces of the main valve member, thereby tending to move it. The pressure force on that control surface is opposed by a biasing force on a second control surface, equal to a fraction of the maximum pressure force which can be produced at the receptor. This biasing force urges the valve member in the opposite direction. When the degree of nozzle alignment is such that the control force just matches the biasing force, the spool is in equilibrium and holds its position. The degree of alignment with respect to the receptor port of the jet tube from which the stream issues is adjusted by an electromechanical force transducer. The instantaneous position of the main valve member with respect to its ports is fed back through a resilient spring coupling to the jet tube permitting or tending to change the displacement of the stream on the receptor, so that the movable main valve member is moved to a position whereat the fluid force acting on its first control surface equals and opposes the sum of the pressure force acting on its second control surface plus the mechanical reaction force of a feedback spring acting on the main valve member.

The transducer which controls the degree of alignment of the jet tube nozzle with the receptor port applies a force to it according to a current signal applied to the transducer. I have found that a transducer of the moving coil type, for example of the type known for use in radio speakers, is especially effective for this application. The coil of the transducer is connected to move the jet tube from a position of alignment, and is nulled between an adjustable null spring and the feedback spring.

The mechanism provided is considerably simpler to manufacture than previous devices of the general type, yet provides the high amplification, sensitivity, and ease of control characteristic of jet displacement servovalves.

The details of the invention can best be further explained, and the objectives and advantages thereof can best be further understood, from the drawings in which:

FIGURE 1 is a vertical axial section of a servovalve in accordance with a preferred form of the invention, showing the jet nozzle aligned with the receptor port and the movable main valve member in the center position;

FIGURE 2 is a transverse vertical section on a smaller scale, the view being taken on line 2—2 of FIGURE 1.

Figure 3:
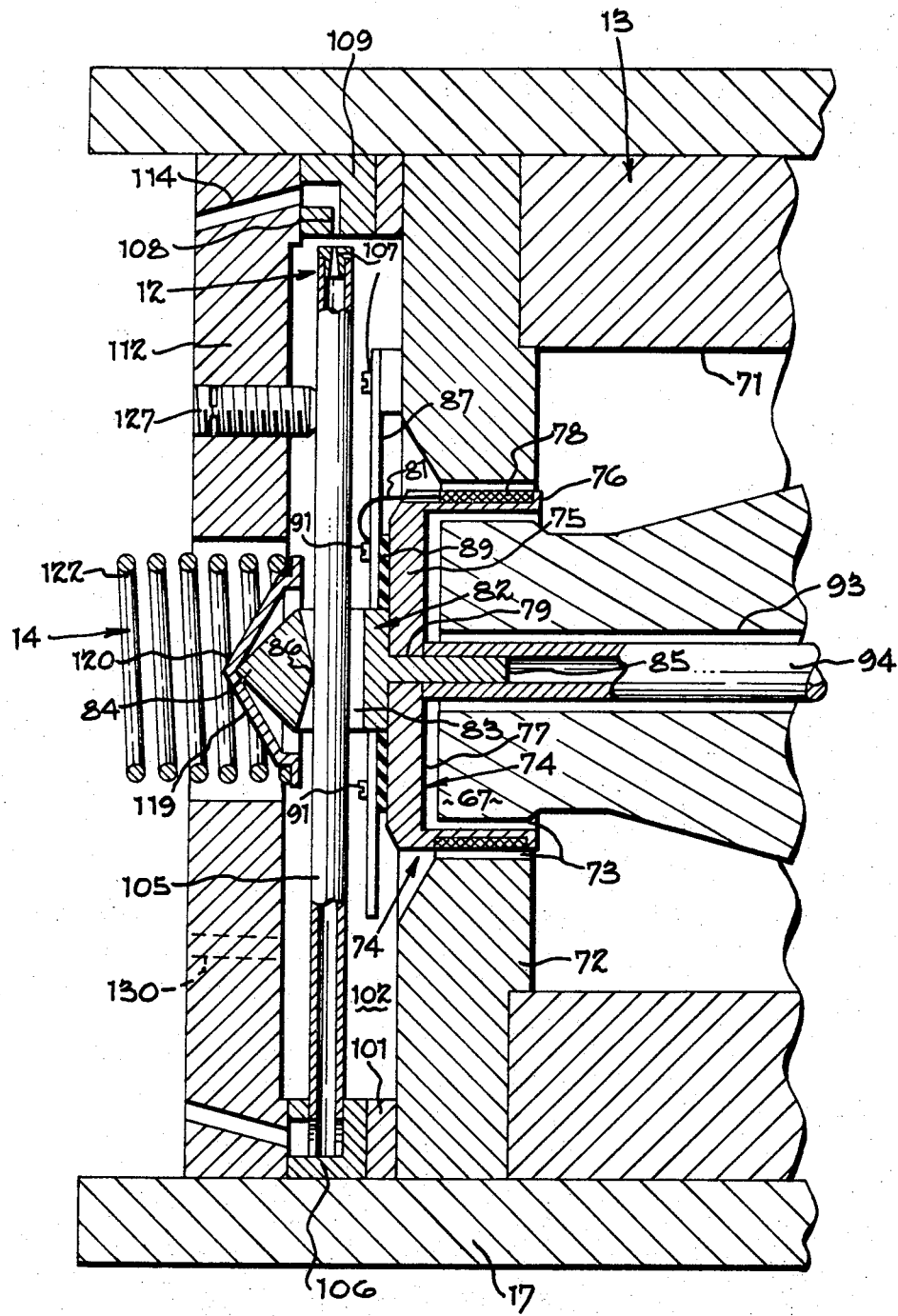
FIGURE 3 is a view in vertical axial section, on a larger scale, of a fragment of the servovalve and showing a portion of the electromechanical transducer and the pilot stage of the servovalve.

The servovalve designated generally at 10 in FIGURE 1 comprises a main or secondary valve stage or section 11 and a jet displacement type pilot or primary stage designated generally at 12. The pilot stage 12 is operated by an electromagnetic transducer 13 according to an electrical signal applied thereto. Mechanical force feedback between the secondary and pilot valve stages 11 and 12 respectively is provided by spring coupling means designated at 14.

In the preferred form of the invention shown, secondary stage 11 is housed within a cast body 16, and the primary stage 12 and transducer 13 are enclosed within a cap or cover structure 17 which is suitably sealed and secured to the body 16 to form therewith a housing for the components of the valve 10.

Body 16 has a planar end surface 18, from which a central or axial through bore 19 extends at right angles. A series of ports 21, 22, 23, 24, and 25 are formed in body 16 and enter bore 19 at axially spaced positions. In use, ports 22 and 24 are connected through suitable passage means in a work circuit including a work load, not shown, for the application of motive fluid to move the work load in a desired direction. Ports 21 and 25 are connected together, as shown by the dotted lines in FIGURE 1, and in use are connected through a pressure port 20 to a source of pressure fluid, not shown, which may be conventional. Port 23 is a drain port which in use is connected to a fluid reservoir or tank.

A cylindrical sleeve or fixed valve member 28 is sealed axially within body bore 19. Sleeve 28 is generally cylindrical and has an axial bore 29. Circumferential grooves 31, 32, 33, 34, and 35 are formed around sleeve 28 at axially spaced positions aligning respectively with body ports 21, 22, 23, 24, and 25. Fluid communication between the axial sleeve bore 29 and the respectve grooves is provided by radial ports 36, 37, 38, 39, and 40.

A movable piston or spool valve member 43 is slidably disposed in sleeve bore 29, and is formed with axially spaced grooves 46, 47, and 48 which define a land 50 at the outboard end of spool 43, and intermediate lands 51 and 52. Intermediate lands 51 and 52 preferably have axial dimensions substantially equal to those of sleeve ports 37 and 39 respectively, to form closures therewith when the spool is in its centered position. A bearing or guide 53 is defined at the inboard end of spool 43 and this land contains a small breather passage or through slot 54. Groove 48 of spool 43, which is to the left in FIGURE 1 of guide 53, is of such diameter that an inboard annular control surface 56 defined on land 52 has an area which is substantially less than, and is preferably about one-half, the cross-sectional area of the opposite or outboard spool control surface 63. A bushing 57 around the reduced diameter portion 58 of the spool provides a seal between spool portion 58 and bore 29. The left or outboard end of body bore 19 is closed and sealed by a plug 61, and a control chamber 62 is defined in bore 19 between plug 61 and spool control surface 63.

Cap or cover 17 is bored to provide a cylindrical internal chamber 66 in which the electromechanical transducer assembly 13 is secured. Transducer 13 is preferably of the moving coil type shown, wherein an electric coil is mounted to move axially in an annular air gap between inner and outer pole pieces of a permanent magnet assembly. The flow of current in the coil causes an electromagnetic force proportional to the magnitude of the coil current to act on the coil tending to move it axially in the air gap. The preferred form of transducer includes a cylindrical inner pole piece 67 which flares conically to a flange 68 seated against a shoulder 69 in cap chamber 66. A permanent magnet in the form of an axially magnetized ring 71 engages pole piece flange 68 on one side, and on the other side is engaged by an annular outer ferromagnetic pole piece 72. The air gap 73 in the magnetic circuit about magnet 71 is an annulus between opposing cylindrical surfaces of the inner and outer pole pole pieces 67 and 72 with the magnetic flux being radially directed across the gap.

The coil assembly designated generally at 74 includes a nonmagnetic insulating cup-shaped member 75 having a cylindrical wall, skirt or shell 76 and a generally planar bottom portion 77, best shown in FIGURE 3. An electrical coil 78, having leads 80, 81 (see FIGURE 2) is wound around the cylindrical shell portion 76 of the cup-shaped member 75. The bottom 77 of the cup-shaped member of the coil assembly has a central opening 79 through which extends the stem 85 of a non-magnetic, shouldered jet tube deflector 82. On the other side of member 75, jet tube deflector 82 is provided with a transverse vertical slot 83 extending across the centerline of the coil assembly 74, in which a line contact edge 86 is formed for engaging the jet tube, as will be described. A conical tip or point 84 is formed on deflector 82 for engaging the mechanical feedback mechanism 14.

The coil assembly 74 is supported for axial movement in air gap 73 by a pair of flexible spring mounts 87, 88 (see FIGURE 2), which are secured to the bottom of cup-shaped member 75 through an insulating disk 89, by means of four screws 91. The mountings 87 and 88 may be generally J or U-shaped, as shown in FIGURE 2, being connected through one leg to the insulating disk 89 and through the other leg to pole pieces 72. The flexible mountings 87 and 88 should be very flexible in the axial direction to permit an essentially frictionless movement of coil assembly 74 through air gap 73. It is convenient that these members 87 and 88 also comprise leads to carry the coil current for leads 80 and 81, or flexible lead wires may be used.

The inner pole piece 67 has a central bore 93 in which a nonmagnetic tubular member 94 is supported for free axial movement. At one end this tubular member 94 is press-fitted over stem 85 of the tube deflector 82 and bears against the bottom 77 of cup-shaped member 74. At its other end, i.e., the right end as seen in FIGURE 1, tube 94 is supported by an assembly which is similar to that by which the coil assembly 74 is supported. These mounting means include two flexible support members 96 similar to the flexible mountings 87, 88, and a pointed end bearing 97 having a shank which is engaged within tube 94. From FIGURE 1 it can be seen that by the flexible mounting means provided at each end thereof, the rod 94 and hence coil assembly 74 are movable over a limited distance in the axial direction without significant friction.

A lip or flange 101 of a centrally recessed cover plate 112 facially engages outer pole piece 72 in cap chamber 66. An elongated flexible hollow tube or jet pipe 105 is supported in a chamber 102 in the cap, by a block or insert 106 having an aperture into which one end of the tube is secured. Tube 105 extends through the slot 83 in the jet tube deflector 82, being engaged therein only by the edge 86 thereof, and has structure forming a nozzle outlet 107 at the displaceable end thereof.

It will be seen that the jet tube 105 is operated in bending to the right by movement of coil assembly 74. A single receptor port 108 is provided in a block 109 in the lip or flange 101 adjacent the outlet of nozzle 107. The cover plate 112 resides in facial engagement with the surface 18 of body 16, as shown in FIGURE 1.

A passage 113 is provided through body 16, cover plate 112 and block 106 to provide fluid communication from the pressure passageways 21 and 25 to the tube 105. A receptor outlet passageway 114 is provided in body 16, plate 112 and block 109 between receptor port 108 and the outboard control surface 63 of the second stage spool 43, to reflect on the control surface the fluid pressure established at the receptor port.

Mechanical force feedback coupling between the spool and the pilot valve is provided by the means designated generally at 14. The coupling 14 includes a pair of hollow conical spring retainers 118, 119 having apices 120, 120 which are seated respectively on the pointed end 121 of main spool portion 58 and on the pointed end 84 of jet tube deflector 82. A spring 122 is compressed between peripheral flanges on these spring retainers 118, 119.

Reduced diameter portion 58 of main spool 43 projects through an opening formed in a disk-like collar 125 which is seated in body bore 19 against the end of sleeve 28. Collar 125 is spaced from plate 112 by a tubular bushing 126 into which the spool pointed end 121 extends and in which spring retainer 118 and spring 122 are movably disposed.

Jet tube 105 is movable in an axial plane in chamber 102 in response to a bending moment applied to it by movement of the coil assembly 74. Movement of the jet tube in the direction away from magnet 71 is limited by an adjustable stop 127 in plate 112, positioned so that leftward movement of nozzle 107 beyond its position of maximum alignment with receptor 108 is prevented. As shown in FIGURE 2, movement of jet tube 105 in the transverse plane is restricted by a tie wire 128 extending from ring 111 to a point on tube 105 adjacent the nozzle thereof. This tying member 128 has a bending moment which is sufficiently small that it does not undesirably impede movement in an axial plane of jet tube 105 in response to a force applied thereto by actuation of the coil assembly 74. The chamber 102 in which the jet tube moves is connected by a drain line 130 extending through plate 112 and body 16 to drain port 23.

A null adjusting means is designated generally at 132. This mechanism 132 is seated at one end in a hollow plug 133 threaded into end opening 134 in cap 17. Member 97 of the right end support for tube 94 has a conical tip which may be similar to that of jet tube deflector 82. Plug 133 has an internal bore 135 at the stopped end of which a pointed bearing member 136 resides, having a tip which is in axial alignment with the tips of tube right end bearing 97, jet tube deflector 82 and tip 121 of main spool 43. A spring 137 is compressed between a pair of hollow conical spring retainers 138, 139 which may be similar to retainers 118 and 119, and which are supported on members 97 and 136. Spring 137 exerts a force on coil assembly 74 tending to move it oppositely to spring 122. The compression of spring 137 can be adjusted by threading plug 133 into or out of cap opening 134. Locking and sealing means 140 provide a fluid seal around plug 137 and lock it in selected position with respect to cap 17.

When no hydraulic pressure is applied to pressure port 20 and no electric current is applied to coil 78, the spool 43 is urged to its maximum left-hand or outboard position by the springs 122 and 137 and the jet tube 105 rests against the stop screw 127 with the projector jet nozzle 107 substantially fully aligned with the receiver port 108.

When pressure is applied to pressure port 20, a stream of fluid issues from the jet nozzle 107 and is received in the receptor port 108 to pressurize the chamber 62. The pressure in chamber 62 acting on the larger end surface 63 of the spool valve 43 will rise to that point where it will overcome the combined leftward-acting forces of springs 122 and 137 and the hydraulic force acting upon the spool land 56, and move the spool 43 to the right. Movement of spool 43 to the right will compress the springs 122 and 137 and will also flex the resiliently yieldable jet tube 105 toward the right to disalign the jet nobble 107 and receptor port 108 and thereby limit the pressure in the chamber 62 to that which is just necessary to hold the spool 43 in the position shown in FIG. 1 of the drawings. It will be noted that in this null or centered position, the lands 51 and 52 close the work ports 22 and 24, respectively. The null adjusting spring 137 may be adjusted by screw 133 to position the spool 43 in its exact balanced null position with no coil current applied.

When the valve is to be operated electrically, an electric current of the proper polarity is applied to coil 78 to urge the coil assembly 74 either to the right or left as desired.

If, for example, an electric current of such polarity is applied to coil 78 to move the coil assembly 74 electromagnetically to the left, as seen in FIG. 1, from its no-current position the jet tube 105 will be permitted to align or more nearly align the jet nozzle 107 with the receptor port 108, thereby increasing the pressure in chamber 62 and urging spool 43 toward the right to connect ports 21, 22 and 23, 24. As the spool 43 moves to the right, it compresses the feedback spring 122 until the spring force balances the leftward force of the coil assembly 74. Thus the spool takes a rest position at a distance from null approximately proportional to the input current.

If an electric current of the opposite polarity is applied to coil 78 to move the coil assembly 74 to the right, then the jet tube 105 will also be moved to the right, thereby moving jet nozzle 107 in a direction away from its fully aligned position, so that the pressure in chamber 62 is reduced and spool 43 is urged to the left to connect ports 22, 23 and 24, 25. As the spool 43 moves toward the left, it lessens the force of the feedback spring 122 and counteracts the increased rightward electromagnetic force of the coil 78 to cause the nozzle 107 to return to its balanced position. At this point the spool is at rest at a displacement approximately proportional to input current.

The fluid emitted from the jet nozzle 107 and directed generally toward the receptor port 108, and any fluid which is discharged from the chamber 62 through receptor port 108, are combined within the cap or cover 17 and drained therefrom through a drain line 130 which is connected with the drain port 23.

While I have described a preferred form of the servovalve of this invention, those skilled in the art will recognize that its structural form is not limited solely to that described, but that the invention includes other forms and embodiments within the scope of the following claims:

1. An electrohydraulic servovalve comprising,
a main valve stage including a valve spool positionable by fluid pressure forces acting upon opposed control surfaces thereof, said opposed control surfaces being of unequal areas,
a pilot valve stage including a yieldably movable jet tube for discharging a fluid jet developing a pressure at an opposed single receptor according to the degree of alignment of said jet with said receptor,
an electromagnetic transducer operable in response to an electric current to apply a force to said tube tending to change the degree of alignment of said jet with said receptor,
means biasing said transducer toward a null position,
mechanical force feedback means between said spool and jet tube for applying a mechanical force to said tube in accordance with the position of said spool,
passage means between said receptor and the larger of said opposed control surfaces,
and passage means for applying pressure fluid from a source into said tube to establish said jet and onto the smaller of said control surfaces.

2. The servovalve of claim 1 wherein said transducer includes an electric coil movable in the air gap of a magnet, said coil being mechanically connected to move said tube in the direction of increasing disalignment with said receptor.

3. The servovalve of claim 2 wherein said air gap is an annular space between radially opposed pole pieces, and wherein said coil is mounted for movement only in the axial direction in said gap, in response to a current applied to said coil.

4. The servovalve of claim 3 wherein said coil engages said tube through a member affixed to said coil having a single edge which bears upon said tube at a position between the ends thereof.

5. The servovalve of claim 3 wherein said coil is acted upon by opposed spring members tending to oppose axial movement of said coil from a no-current position thereof.

6. The servovalve of claim 5 wherein one of said spring members is a compression spring adjustable to vary the force thereof on said coil.

7. The servovalve of claim 6 wherein the other of said spring members is said mechanical feedback means, and comprises a compression spring acting between said spool and said tube.

8. The servovalve of claim 7 wherein said spring members are aligned with the axis of said coil.

9. The servovalve of claim 1 wherein said tube extends in a direction perpendicular to the axis of said spool and wherein said feedback means comprises a spring mounted between one end of said spool and said tube.

10. The servovalve of claim 9 wherein said larger control surface is an end surface of said spool and wherein said smaller control surface is defined on a land on said spool adjacent said feedback means.

11. The servovalve of claim 1 wherein pressure fluid is supplied to said smaller of said control surfaces through a passageway which is defined at least in part by said spool.

12. A servovalve comprising
- a jet discharge valve including a bendable jet tube for directing a fluid jet toward a receptor,
- a spool slidable in a bore to control the passage of fluid through ports entering said bore,
- said spool being positionable in said bore by fluid forces acting on opposed control surfaces on said spool, the opposed control surfaces having unequal areas,
- a pressure inlet connected to supply pressure fluid into said jet tube and to the smaller of said control surfaces,
- passage means for applying the pressure established at said receptor by said jet on the larger of said control surfaces,
- an electromagnetic transducer for displacing said jet tube with respect to said receptor in response to a current,
- said transducer including a current operated movable element engaging said tube,
- spring means biasing said tube toward alignment with said receptor,
- and compression spring means between said spool and said movable element acting in opposition to said biasing means.

13. The servovalve of claim 12 wherein said transducer is a voice coil driver.

14. The servovalve of claim 13 wherein said biasing means establishes a no-current position of said tube at which said jet impinges only partially on said receptor.

15. A servovalve comprising,
- a valve spool positionable in a bore to vary the passage of fluid through ports communicating with said bore, said spool being positionable by fluid pressure forces acting upon opposed control surfaces of said spool, said opposed control surfaces being of unequal areas,
- a jet tube bendable as a spring and having a nozzle for establishing a fluid jet for developing a pressure at a receptor according to the degree of alignment of said jet with said receptor,
- an electromagnetic transducer operable in response to an electric current to apply a force to said tube tending to deflect said tube from its no-current position with respect to said receptor,
- a feedback spring operating between one end of said spool and said tube,
- spring means acting on said tube to oppose the force of said spring,
- passage means between said receptor and the larger of said opposed control surfaces,
- and passage means for applying pressure fluid from a source to said tube and onto the smaller of said control surfaces.

References Cited
UNITED STATES PATENTS

| | | | |
|---|---|---|---|
| 2,750,961 | 6/1956 | Uritis | 251—129 XR |
| 2,962,002 | 11/1960 | Hayner | 137—625.64 |
| 2,973,746 | 3/1961 | Jupa | 137—625.63 |

HENRY T. KLINKSIEK, *Primary Examiner.*